United States Patent [19]

Linde

[11] 4,450,141
[45] May 22, 1984

[54] CENTRIFUGAL REACTION CHAMBER

[75] Inventor: Ronald K. Linde, Chicago, Ill.

[73] Assignee: Envirosonics, Inc., Chicago, Ill.

[21] Appl. No.: 388,751

[22] Filed: Jun. 16, 1982

[51] Int. Cl.³ .......................... B01F 7/20; B01J 19/10
[52] U.S. Cl. .................................. 422/225; 366/293;
  366/309; 366/343; 422/128
[58] Field of Search ............... 422/225, 135, 210, 271,
  422/127, 128; 366/343, 309, 312, 292, 299, 313,
  165, 293

[56] References Cited

U.S. PATENT DOCUMENTS

| 2,676,760 | 4/1954 | Simpson | 366/309 |
| 2,758,824 | 8/1956 | McIlvaine | 366/309 |
| 3,194,543 | 7/1965 | McIlvaine | 366/309 |
| 3,506,245 | 4/1970 | Noschinski et al. | 366/313 X |
| 3,979,961 | 9/1976 | Schnur | 366/165 X |
| 4,366,123 | 12/1982 | Kato et al. | 422/135 |

FOREIGN PATENT DOCUMENTS

| 142006 | 7/1951 | Australia | 422/128 |
| 1015962 | 1/1966 | United Kingdom | 422/127 |
| 1250984 | 10/1971 | United Kingdom | 366/313 |

Primary Examiner—Barry S. Richman
Assistant Examiner—William R. Johnson
Attorney, Agent, or Firm—Christie, Parker & Hale

[57] ABSTRACT

A centrifugal reaction chamber for enhancing the chemical reaction between two or more reactants, one of which is solid particulate material and another of which is a liquid in which the particulate matter is dispersed. The chamber normally is formed by a cylindrical tub having a drive shaft for rotating divider means secured to the shaft and forming one or more radial dividers extending between the shaft and cylindrical wall of the tub. Each divider includes two panels spaced apart and converging in a radial direction away from the shaft. One panel urges the particulate material from the center toward the wall of the tub. The particulate material then is directed back toward the center by the second panel.

2 Claims, 2 Drawing Figures

CENTRIFUGAL REACTION CHAMBER

FIELD OF THE INVENTION

This invention relates to apparatus for accelerating the reaction between two or more chemical constituents, and more particularly, is concerned with a centrifugal device for alternately accelerating the constituents away from and toward the center of the reaction chamber.

BACKGROUND OF THE INVENTION

It is well-known that the reaction rate between two or more chemical constituents is enhanced by bringing the constituents into more intimate contact. Thus various types of mixing, stirring, agitating, and/or centrifuging methods have been used to produce faster and more complete reaction between two or more chemical constituents. However, such conventional systems have been designed to operate on a gross scale but have not provided optimal mixing on a sufficiently microscopic scale.

A limiting factor in the rates at which a chemical reaction proceed normally is the buildup of the reaction product and/or partially reacted material in the interfaces between the reacting constituents. A boundary layer is formed which slows down the interaction at the molecular level between the chemical components of the reaction. Because of adhesive and/or cohesive forces of the boundary layer, the boundary layer cannot be removed unless these forces are overcome in some manner.

SUMMARY OF THE INVENTION

The present invention is directed to apparatus for enhancing the reaction rate by alternately accelerating the constituents away from and then back toward the center of the reaction chamber. The heavier and lighter components are accelerated at different rates so as to allow new interfaces to be continually formed, thereby reducing the effect of boundary layer formation.

This is achieved by providing a centrifugal reaction chamber comprising a stationary drum normally having a cylindrical side wall for holding a mixture of solid particles dispersed in a liquid. A drive shaft extending along the axis of the drum is rotated by suitable drive means, the shaft in turn rotating one or more radial dividers which extend along the length of the shaft and radially from the shaft toward the side wall of the drum. Each radial divider includes first and second panels which are circumferentially spaced from each other and converge outwardly at an acute angle. As a result of centrifugal action, the first panel directs the dispersed particles outwardly toward the side wall where they pass around the outer edge of the first panel into the space between the two panels. The second panel acts to divert the particles back toward the center through the space between the two panels.

DESCRIPTION OF THE DRAWINGS

For a better understanding of the invention, reference should be made to the accompanying drawings, wherein.

DETAILED DESCRIPTION

Figure 1:
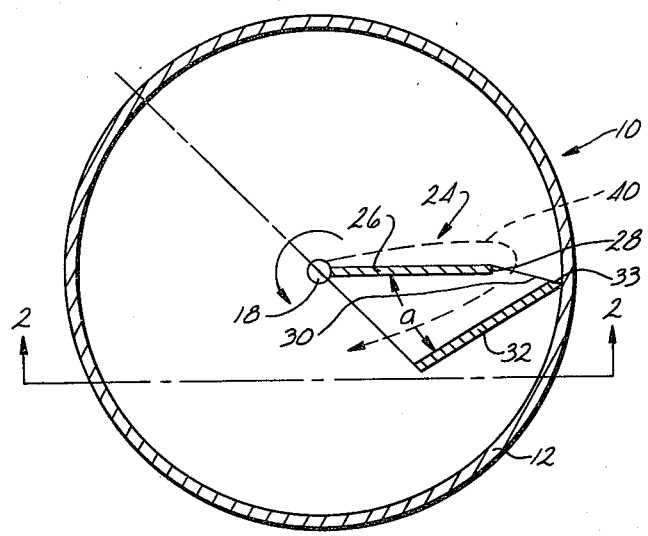
FIG. 1 is a top view of the preferred embodiment of the present invention.
Figure 2:
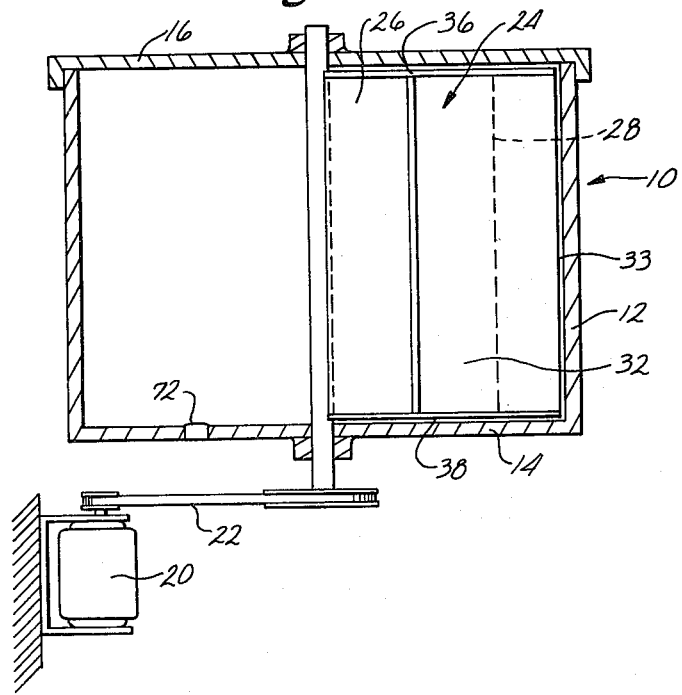
FIG. 2 is a sectional view taken substantially on the line 2—2 of FIG. 1.

Referring to the drawings in detail, the numeral 10 indicates generally a vat or tub having a cylindrical side wall 12, a bottom wall 14 and a removable cover 16. A drive shaft 18 is journaled in the lid 16 and bottom wall 14 along the central axis of the cylindrical tub. The shaft is rotated by a motor 20 through a belt and pulley drive 22.

The drive shaft 18 produces rotation of a radially extending divider assembly 24 which extends between the drive shaft 18 and the inner surface of the cylindrical wall 12. The divider assembly includes a first baffle in the form of a flat rectangular panel 26 secured along one edge to the drive shaft 18. The panel extends radially toward the cylindrical wall and terminates in an outer edge 28 which is spaced from the outer wall by a gap 30.

The divider assembly 24 includes a second baffle in the form of a flat rectangular panel 32 having an outer edge 33 which is immediately adjacent the inner surface of the outer wall 12 and extends inwardly from the cylindrical wall for a distance to overlap a substantial portion of the radial extent of said first panel and, thereby, provide a passage therebetween. The panel 32 is in a plane which extends at an acute angle relative to the plane of the first panel 26, the two planes converging adjacent to a point on the wall of the vessel nearest the outer edge of the first panel 26. Depending upon the mixing requirements, either or both panels may be solid or perforated.

The panel 32 is supported from the panel 26 by upper and lower frame members 36 and 38.

In operation, as the drive shaft 18 rotates in a counterclockwise direction, as viewed in FIG. 1. The first panel 26 pushes against and tends to rotate the mixture of solids and fluids in the tub. Centrifugal force causes the materials to move radially outwardly relative to the panel 26 as the mixture flows past the outer edge 28, through the gap 30 and into the passage where it comes in contact with the second panel 32. Because the second panel extends at an angle $\alpha$ relative to the radius, the panel 32 provides a net component of force on the mixture in a direction away from the side wall back toward the center of the tub. Thus a flow pattern is set up which is shown by the dotted arrow 40 in FIG. 1.

In addition to applying forces to the constituents by moving dividers or vanes, forces can be applied by sonic waves set up in the liquid. For example, one or more sonic transducers 72 may be mounted in the bottom or lid of the vat or tub, the transducer being driven from an audio signal generator (not shown) to produce sound waves in the liquid reactant.

What is claimed is:

1. A centrifugal reaction chamber comprising:
a substantially cylindrical vessel for holding the chemical reactants, one of which is a liquid, a shaft journaled for rotation in the vessel and coaxial with the cylindrical vessel, one or more rotating mixing elements in the vessel secured to the shaft, and means for rotating the shaft and mixing elements, each mixing element including a pair of panels and means securing the panels in a fixed closely spaced relationship to form a radially extending passage between the panels, a first panel of each mixing element extending radially outwardly from the shaft and terminating in an outer edge adjacent to but spaced from the cylindrical wall of the vessel, a second panel of each mixing element having an outer edge positioned at the cylindrical wall and extending inwardly from the cylindrical wall for a distance to overlap a substantial portion of the radial extent of said first panel and, thereby, provide a passage therebetween, the panels lying in planes which converge at an acute angle and intersect adjacent the point on the wall of the vessel nearest said outer edge of the first panel, said means for rotating the shaft moving the said first panel ahead of the second panel and forcing the reactants radially outwardly into engagement with the second panel at the wall of the vessel, the second panel forcing the reactants radially inwardly toward the center of the vessel along the backside of said first panel through said passage between the panels.

2. Apparatus of claim 1 further including a pair of flat frame members securing the panels together for rotation as a unit, the frame members being secured to the panels respectively along the top and bottom edges of said panels, whereby the panels and frame members form said passage through which the reactants move in a direction from the cylindrical wall of the vessel towards the center of the vessel.

* * * * *